United States Patent [19]
Helm et al.

[11] Patent Number: 5,129,069
[45] Date of Patent: Jul. 7, 1992

[54] METHOD AND APPARATUS FOR AUTOMATIC MEMORY CONFIGURATION BY A COMPUTER

[75] Inventors: Gordon L. Helm, St. Joseph; Mark D. Nicol, Stevensville, both of Mich.; William J. McAuliffe, Clay Township, St. Joseph County, Ind.; Anthony M. Olson; Todd R. Witkowski, both of Stevensville, Mich.

[73] Assignee: Zenith Data Systems Corporation, Buffalo Grove, Ill.

[21] Appl. No.: 301,607

[22] Filed: Jan. 24, 1989

[51] Int. Cl.$^5$ .................. G06F 12/00; G06F 13/00
[52] U.S. Cl. .................................... 395/400; 395/425
[58] Field of Search ... 364/200 MS File, 900 MS File; 395/400, 425

[56] References Cited

U.S. PATENT DOCUMENTS

| Re. 31,318 | 7/1983 | Kaufman et al. | 364/200 |
|---|---|---|---|
| 3,781,812 | 12/1973 | Wymore et al. | 364/200 |
| 3,815,103 | 6/1974 | Holtey et al. | 364/200 |

FOREIGN PATENT DOCUMENTS

1116869 9/1966 United Kingdom .

Primary Examiner—Terrell W. Fears
Assistant Examiner—Michael A. Whitfield
Attorney, Agent, or Firm—Flynn, Thiel, Boutell & Tanis

[57] ABSTRACT

A memory system includes a memory unit with plural addressable storage locations, a connector arrangement for detachably electrically coupling the memory unit to a computer, and a decoding arrangement for determining whether a computer memory address is within a range of addresses to which the memory unit is to respond, the decoding arrangement including a base address register storing a value representing the first address in the range and a size register defining the number of addresses in the range. A method by which a computer can automatically configure this system includes the steps of determining a base address to be associated with the connector, loading into the base address register a value representing the base address, loading into the size register a value representing the maximum range of addresses, thereafter selectively accessing storage locations to determine the actual number of contiguous locations in the memory unit, and then changing the size register, when the actual number of locations is less than the maximum range of addresses, to a value representing the actual number of locations.

14 Claims, 9 Drawing Sheets

Fig. 4
SWSET = (PRIVY & IOW & BRDSEL & !RESET & !A9 & !A8 & A7 & A6 & A5 & A4 & !A3 & A2 & A1 & !A0)

Fig. 5A
ACCESS0 = (M25 & M24 & M23 & M22 & M21 & M20 & BNKSEL0)

Fig. 5B
ACCESS1 = (M25 & M24 & M23 & M22 & M21 & !M20 & !ABS20 & BNKSEL1) +
(M25 & M24 & M23 & M22 & !M21 & M20 & !ABS21 & ABS20 & BNKSEL1) +
(M25 & M24 & M23 & !M22 & M21 & M20 & !ABS22 & ABS21 & ABS20 & BNKSEL1) +
(M25 & M24 & !M23 & M22 & M21 & M20 & !ABS23 & ABS22 & ABS21 & ABS20 & BNKSEL1) +
(M25 & !M24 & M23 & M22 & M21 & M20 & !ABS24 & ABS23 & ABS22 & ABS21 & ABS20 & BNKSEL1) +
(!M25 & M24 & M23 & M22 & M21 & M20 & !ABS25 & ABS24 & ABS23 & ABS22 & ABS21 & ABS20 & BNKSEL1)

Fig. 5C
ACCESS2 = (M25 & M24 & M23 & M22 & !M21 & M20 & !ABS21 & BNKSEL2) +
(M25 & M24 & M23 & !M22 & M21 & M20 & !ABS22 & ABS21 & BNKSEL2) +
(M25 & M24 & !M23 & M22 & M21 & M20 & !ABS23 & ABS22 & ABS21 & BNKSEL2) +
(M25 & !M24 & M23 & M22 & M21 & M20 & !ABS24 & ABS23 & ABS22 & ABS21 & BNKSEL2) +
(!M25 & M24 & M23 & M22 & M21 & M20 & !ABS25 & ABS24 & ABS23 & ABS22 & ABS21 & BNKSEL2)

Fig. 5D
ACCESS3 = (M25 & M24 & M23 & !M22 & M21 & M20 & !ABS22 & ABS20 & BNKSEL3) +
(M25 & M24 & M23 & !M22 & !M21 & M20 & !ABS22 & ABS20 & BNKSEL3) +
(M25 & M24 & !M23 & M22 & M21 & M20 & !ABS23 & ABS22 & ABS20 & BNKSEL3) +
(M25 & M24 & !M23 & M22 & !M21 & M20 & !ABS23 & ABS22 & ABS20 & BNKSEL3) +
(M25 & !M24 & M23 & M22 & M21 & M20 & !ABS24 & ABS23 & ABS22 & ABS20 & BNKSEL3) +
(M25 & !M24 & M23 & M22 & !M21 & M20 & !ABS24 & ABS23 & ABS22 & ABS20 & BNKSEL3) +
(!M25 & M24 & M23 & M22 & M21 & M20 & !ABS25 & ABS24 & ABS23 & ABS22 & !ABS20 & ABS21 & ABS22 & ABS20 & BNKSEL3) +
(!M25 & M24 & M23 & M22 & !M21 & M20 & !ABS25 & ABS24 & ABS23 & ABS22 & ABS20 & BNKSEL3)

Fig. 5E
ACCESS4 = (M25 & M24 & M23 & !M22 & M21 & M20 & !ABS22 & BNKSEL4) +
(M25 & M24 & !M23 & M22 & M21 & M20 & !ABS23 & ABS22 & BNKSEL4) +
(M25 & !M24 & M23 & M22 & M21 & M20 & !ABS24 & ABS23 & ABS22 & BNKSEL4) +
(!M25 & M24 & M23 & M22 & M21 & M20 & !ABS25 & ABS24 & ABS23 & ABS22 & BNKSEL4)

```
ACCESS5 =  (M25 & M24 & M23 & !M22 & !M21 & !M20 & !ABS22 & !ABS21 & ABS20 & BNKSEL5) +
           (M25 & M24 & !M23 & !M22 & !M21 & !M20 & !ABS22 & ABS21 & ABS20 & BNKSEL5) +
           (M25 & !M24 & !M23 & !M22 & !M21 & !M20 & !ABS22 & ABS21 & !ABS20 & BNKSEL5) +
           (M25 & !M24 & M23 & !M22 & !M21 & !M20 & !ABS23 & ABS22 & !ABS21 & ABS20 & BNKSEL5) +
           (!M25 & !M24 & !M23 & !M22 & !M21 & !M20 & !ABS23 & ABS22 & ABS21 & ABS20 & BNKSEL5) +
           (M25 & M24 & M23 & M22 & !M21 & !M20 & !ABS23 & ABS22 & ABS21 & !ABS20 & BNKSEL5) +
           (M25 & M24 & !M23 & M22 & !M21 & !M20 & !ABS23 & ABS22 & !ABS21 & ABS20 & BNKSEL5) +
           (M25 & M24 & !M23 & !M22 & !M21 & !M20 & !ABS23 & ABS22 & !ABS21 & !ABS20 & BNKSEL5) +
           (M25 & !M24 & M23 & M22 & !M21 & !M20 & !ABS23 & !ABS22 & ABS21 & ABS20 & BNKSEL5) +
           (M25 & !M24 & M23 & !M22 & !M21 & !M20 & !ABS23 & !ABS22 & ABS21 & !ABS20 & BNKSEL5) +
           (M25 & !M24 & !M23 & M22 & !M21 & !M20 & !ABS23 & !ABS22 & !ABS21 & ABS20 & BNKSEL5) +
           (!M25 & !M24 & !M23 & !M22 & !M21 & !M20 & !ABS25 & ABS24 & ABS23 & ABS22 & !ABS21 & ABS20 &
            BNKSEL5) +

ACCESS6 =  (M25 & M24 & M23 & !M22 & !M21 & M20 & !ABS22 & !ABS21 & ABS20 & BNKSEL6) +
           (M25 & M24 & !M23 & !M22 & !M21 & M20 & !ABS22 & ABS21 & ABS20 & BNKSEL6) +
           (M25 & !M24 & !M23 & !M22 & !M21 & M20 & !ABS22 & ABS21 & !ABS20 & BNKSEL6) +
           (M25 & !M24 & M23 & !M22 & !M21 & M20 & !ABS23 & ABS22 & !ABS21 & ABS20 & BNKSEL6) +
           (!M25 & !M24 & !M23 & !M22 & !M21 & M20 & !ABS23 & ABS22 & ABS21 & ABS20 & BNKSEL6) +
           (M25 & M24 & M23 & M22 & !M21 & M20 & !ABS23 & ABS22 & ABS21 & !ABS20 & BNKSEL6) +
           (M25 & M24 & !M23 & M22 & !M21 & M20 & !ABS23 & ABS22 & !ABS21 & ABS20 & BNKSEL6) +
           (M25 & !M24 & M23 & M22 & !M21 & M20 & !ABS23 & !ABS22 & ABS21 & ABS20 & BNKSEL6) +
           (M25 & !M24 & M23 & !M22 & !M21 & M20 & !ABS23 & !ABS22 & ABS21 & !ABS20 & BNKSEL6) +
           (M25 & !M24 & !M23 & M22 & !M21 & M20 & !ABS23 & !ABS22 & !ABS21 & ABS20 & BNKSEL6) +
           (!M25 & !M24 & !M23 & !M22 & !M21 & M20 & !ABS25 & ABS24 & ABS23 & ABS22 & ABS21 & BNKSEL6)

ACCESS7 =  (M25 & M24 & M23 & !M22 & M21 & !M20 & !ABS23 & ABS20 & BNKSEL7) +
           (M25 & M24 & !M23 & !M22 & M21 & !M20 & !ABS24 & ABS23 & ABS20 & BNKSEL7) +
           (!M25 & !M24 & !M23 & !M22 & M21 & !M20 & !ABS24 & ABS23 & !ABS20 & BNKSEL7) +
           (M25 & !M24 & M23 & !M22 & M21 & !M20 & !ABS24 & ABS23 & !ABS21 & ABS20 & BNKSEL7) +
           (M25 & M24 & !M23 & M22 & M21 & !M20 & !ABS25 & ABS24 & ABS23 & !ABS21 & ABS20 & BNKSEL7) +
           (M25 & M24 & M23 & M22 & M21 & !M20 & !ABS25 & ABS24 & ABS23 & ABS22 & !ABS20 & BNKSEL7) +
           (M25 & M24 & !M23 & M22 & M21 & !M20 & !ABS25 & ABS24 & ABS23 & ABS22 & !ABS21 & ABS20 & BNKSEL7) +
           (!M25 & !M24 & !M23 & M22 & M21 & !M20 & !ABS25 & ABS24 & ABS23 & !ABS22 & ABS21 & !ABS20 & BNKSEL7) +
           (M25 & !M24 & M23 & M22 & M21 & !M20 & !ABS25 & ABS24 & !ABS23 & ABS22 & ABS21 & !ABS20 & BNKSEL7) +
           (M25 & !M24 & M23 & !M22 & M21 & !M20 & !ABS25 & ABS24 & !ABS23 & ABS22 & !ABS21 & ABS20 & BNKSEL7) +
           (M25 & !M24 & !M23 & M22 & M21 & !M20 & !ABS25 & !ABS24 & ABS23 & ABS22 & ABS21 & !ABS20 &
            BNKSEL7) +
           (!M25 & !M24 & !M23 & !M22 & M21 & !M20 & !ABS25 & ABS24 & ABS23 & ABS22 & ABS21 & BNKSEL7)
```

METHOD AND APPARATUS FOR AUTOMATIC MEMORY CONFIGURATION BY A COMPUTER

FIELD OF THE INVENTION

This invention relates to a method and apparatus for configuring the memory of a computer and, more particularly, to a method and apparatus facilitating automatic configuration by a computer of one or more memory units removably plugged into respective connectors of the computer.

BACKGROUND OF THE INVENTION

Computer systems of the type commonly known as personal computers have become very popular in recent years, and typically have several connectors or expansion slots into which a user can removably plug a memory unit in order to increase the amount of random access memory available to the central processing unit (CPU). As part of the process of adding additional memory, the added memory must be configured, which involves assigning the memory unit a range of absolute memory addresses to which it is to respond, and bringing to the attention of the central processing unit the fact that memory has been added and the number of storage locations which are present in the added memory.

One traditional approach is to manually set switches provided on the memory unit or to manually install jumpers on the unit in order to create a hardwired indication of the range of absolute addresses to which the memory unit is to respond. However, this approach is cumbersome, and presents a significant possibility of error in the event a particular switch element or jumper is not manually handled in an accurate manner.

A better approach is automatic configuration by the system itself when it is powered up. One example of this is disclosed in Kaufman U.S. Pat. No. Re. 31,318. This patent discloses an arrangement in which each removable memory unit has a calculating circuit. The CPU provides a base address to the calculating circuit in the first unit, and that unit calculates and provides to the calculating circuit of the second unit an appropriate base address for the second unit, which in turn provides a base address to the calculating circuit of the third unit, and so forth in a daisy-chain manner. While this approach is adequate for its intended purposes, it is not satisfactory in all respects. For example, the need to provide a calculating circuit on each memory unit significantly increases the cost of each memory unit.

It is an object of the present invention to provide an improved method and apparatus for effecting automatic memory configuration in a manner which is highly efficient and yet involves minimal hardware cost.

SUMMARY OF THE INVENTION

The objects and purposes of the invention are met by providing a memory apparatus for a computer which includes: a memory unit having a storage section which includes a plurality of addressable storage locations; a connector arrangement for detachably electrically coupling the memory unit to a computer; and an address decoding arrangement for determining whether a computer memory address output by the computer to which the memory unit is detachably electrically coupled is within a range of consecutive addresses, the address decoding arrangement including a base address register, a size register, and an arrangement for facilitating loading of first and second values respectively into the base address and size registers from a computer to which the memory unit is detachably electrically coupled, the first value defining a memory address in the predetermined range and the second value defining the number of addresses in the range, the storage section including an arrangement responsive to detection by the address decoding arrangement that a computer memory address is within such range for facilitating access to a corresponding one of the plural storage locations by the computer.

A method by which the computer system can automatically effect memory configuration includes the steps of: determining a base address to be associated with the connector arrangement; thereafter outputting for the base address register a first value representing the base address; outputting for the size register a second value defining a number of addresses in a maximum range of addresses for the memory unit; thereafter selectively accessing storage locations having different addresses within the maximum range to thereby determine by the presence and absence of responses from the memory unit the actual number of contiguous storage locations present in the storage section thereof; and thereafter changing the value in the size register, when the actual number of contiguous storage locations in the storage section is less than the number of addresses in the maximum range, to a value representing the actual number of contiguous storage locations in the storage section.

BRIEF DESCRIPTION OF THE DRAWINGS

A preferred embodiment of the invention is described hereinafter with reference to the accompanying drawings, in which:

FIG. 4 sets forth in Boolean form a logic function performed by a decoding circuit of the board of FIG. 2;

FIGS. 5A through 5H set forth in Boolean form respective logic functions performed by a further decoding circuit of the board of FIG. 2;

DETAILED DESCRIPTION

Figure 1:
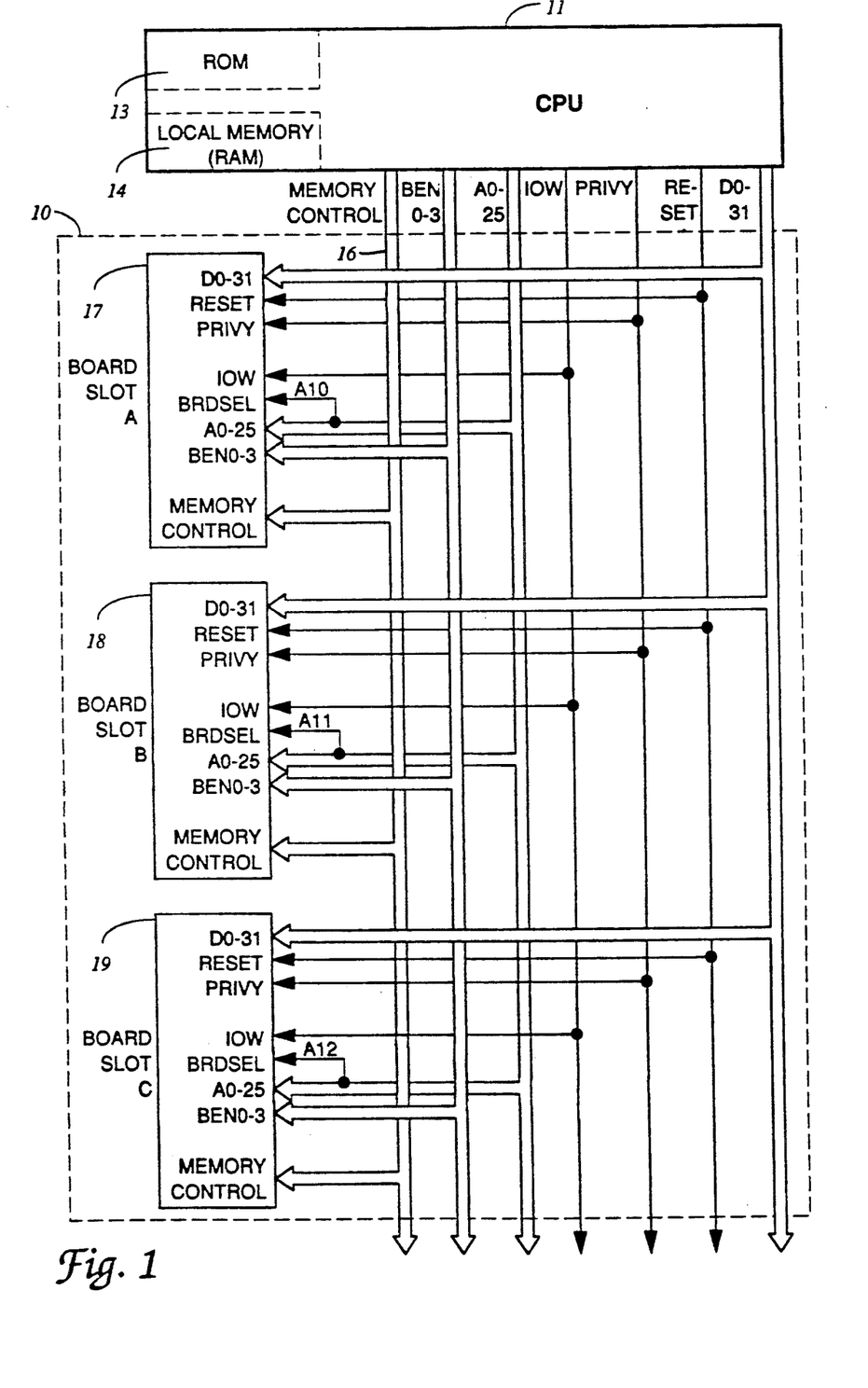
FIG. 1 is a diagrammatic view of a computer system which has several memory expansion connectors and which can be utilized to carry out the method according to the present invention.

Referring to FIG. 1, a computer system 10 includes a central processing unit (CPU) 11. In the preferred embodiment, the CPU 11 includes a conventional and commercially available Intel 80386 microprocessor, but it will be recognized that the present invention could be implemented with almost any conventional microprocessor or equivalent processing unit. Associated with the CPU 11 are a read only memory (ROM) section 13, and a local memory 14 which is a random access memory (RAM). The local memory 14 will be described in detail later.

The CPU 11 sends and receives data in parallel across a 32-bit bidirectional data bus, the lines of which are labeled D0-D31 in FIG. 1, where line D0 carries the least significant data bit. The CPU 11 also produces a number of control signals which facilitate data transfers across the data bus. Those control signals which are pertinent to an understanding of the present invention are illustrated in FIG. 1, whereas other control signals are omitted for clarity.

The control signals produced by the CPU include twenty-six address lines A0-A25, line A0 being the least significant address bit. These address lines permit the CPU to directly address up to 64 megabytes (64 MB). The signal RESET is normally inactive but is temporarily activated at power-up to reset certain memory devices, as described later. The signal PRIVY is set to a binary "1" during memory configuration in order to enable configuration of certain hardware elements, and then is set to a binary "0" and remains there during normal operation to prevent those configured hardware circuits from being inadvertently altered by a user program. The signal IOW is an input/output (I/O) write signal which is a pulse used to strobe data into a selected I/O device. The memory control signals 16 provide an indication to memory devices when a memory access cycle is in progress, include signals which indicate whether the addressed memory location is to be read or written, and may include additional signals required by different types of conventional memory devices to facilitate proper timing of data transfers. The memory control signals 16 are basically conventional and are not themselves a part of the present invention, and are therefore not described in detail here.

The CPU 11 can use the 32-bit data bus D0-31 to simultaneously write 32 bits of data (4 bytes) to a selected memory location or to simultaneously read 32 bits of data from the location. However, while the CPU has the capability to simultaneously read or write a full 32 bits, there may be circumstances in which the CPU 11 wants to read or write only 8 bits of data (1 byte), 16 bits of data (2 bytes) or 24 bits of data (3 bytes). Consequently, the CPU 11 produces byte enable signals BEN0-BEN3. When the signal BEN0 is a binary "0", a selected memory device knows that it should read or write data from or to data bus lines D0-D7, whereas if line BEN0 is a binary "1", the memory device knows that it should not read or write data to or from lines D0-D7 of the data bus. In a similar manner, lines BEN1-BEN3 each control the reading and writing of data to and from a respective group of 8 lines of the data bus. Thus, by appropriately controlling the lines BEN0-3, the CPU 11 can specify whether it is reading or writing 8 bits, 16 bits, 24 bits or 32 bits, and in the case of 8 bits, 16 bits or 24 bits can specify which lines of the data bus are to be involved in the read or write.

As should be apparent from the foregoing discussion, the address bus and data bus are used not only for memory cycles but also I/O cycles, the memory and I/O devices connected to these buses distinguishing a memory cycle from an I/O cycle on the basis of whether the CPU 11 is producing memory control signals at 16 and on lines BEN0-3, or is producing a signal on line IOW.

The computer system 10 includes three connectors 17, 18 and 19, which are typically referred to as memory expansion board slots A, B and C. All of the data and control signals described above are connected to each of the connectors 17-19. In addition, in order to permit the CPU 11 to selectively access each of the connectors in a manner described later, each has a special pin BRDSEL which is connected to a respective line of the address bus, namely address bus lines A10, A11 and A12 for connectors 17, 18 and 19, respectively. Each of the connectors 17-19 can removably receive a memory expansion unit or board of the type which is shown at 24 in FIG. 2 and described later. The purpose for plugging a board of this type into one of the slots 17-19 is to provide additional random access memory for use by the CPU 11 to supplement the RAM 14 already available to the CPU 11.

Figure 2:
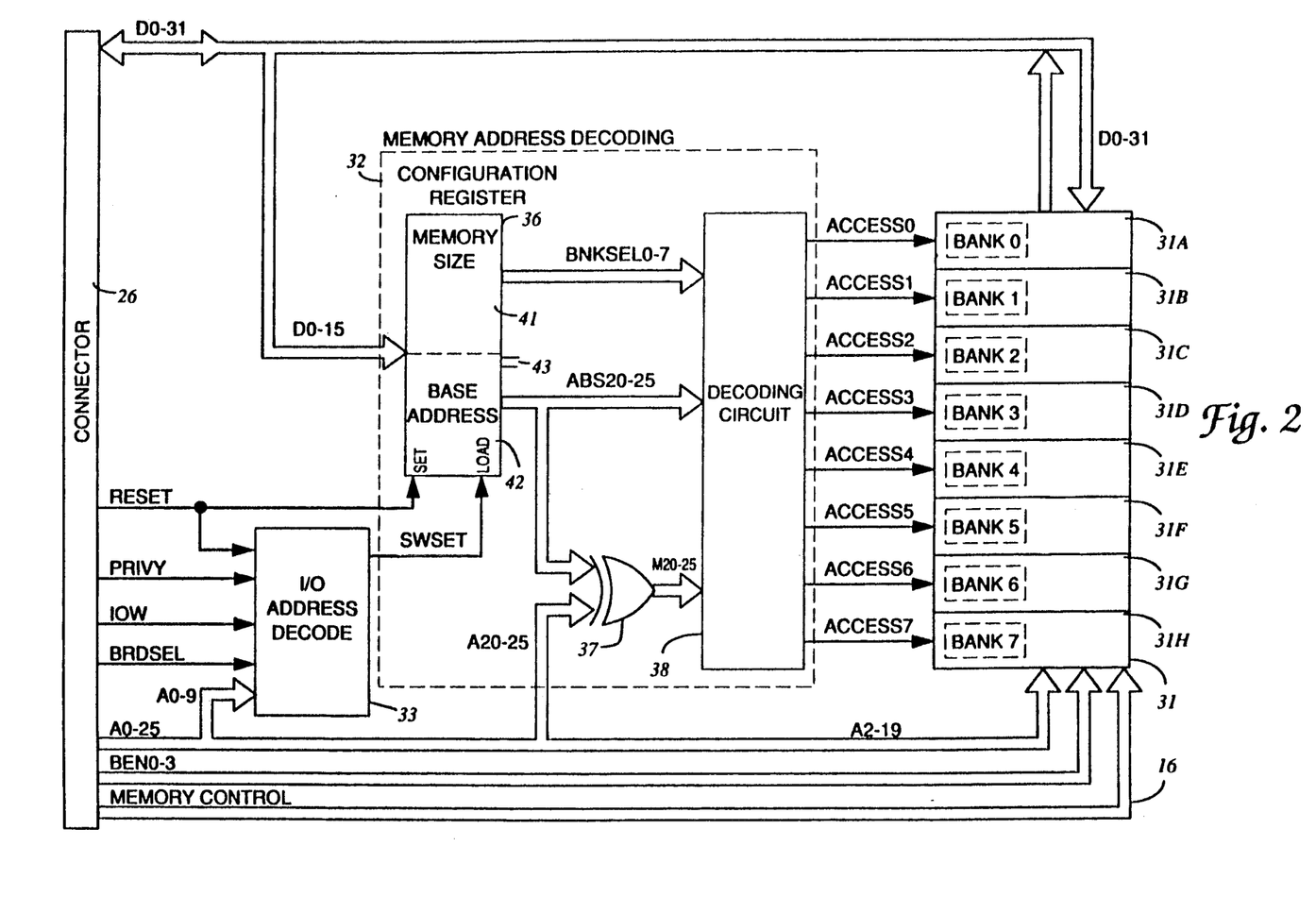
FIG. 2 is a diagrammatic view of a memory expansion board which can be plugged into one of the memory expansion connectors of the system of FIG. 1 and which embodies certain features of the present invention.

Turning now to FIG. 2, the memory expansion board 24 includes a connector 26 which can be physically coupled to any one of the connectors 17-19 in FIG. 1. The signals entering and leaving the board through the connector 26 are the same signals already described in association with FIG. 1, and are therefore not described again in detail here.

The memory expansion board 24 includes a memory storage section 31, a memory address decoding section 32, and an I/O address decoding section 33. The memory storage section 31 is divided into eight banks BANK0-BANK7, which are of identical size. According to the present invention, each bank includes one megabyte (MB) of storage, or in other words 1,048,576 8-bit bytes which are arranged as 262,144 words of 32 bit (4 byte) length. Thus, the maximum number of storage locations in the section 31 of the board 24 is 8 MB. The address bus A0-25 normally specifies during a memory cycle the address of the first of one or more bytes to be accessed. Since each of the banks BANK0-BANK7 is arranged to access data in 4-byte segments or words, the least significant address lines A0 and A1 are effectively ignored, and each bank looks to the eighteen address lines A2-A19 to determine which of the 262,144 words therein is being accessed, and looks to the four byte enable lines BEN0-3 to determine whether or not each of the 4 bytes in the selected location is to be read or written.

The memory address decoding section 32 produces 8 lines ACCESS0-ACCESS7, each of which is connected to a respective one of the banks BANK0-BANK7 as an enable therefor. The lines ACCESS0-ACCESS7 are all normally a binary "0", but the address decoding section 32 can selectively set any one of these lines to a binary "1", and when it sets one of them to a binary "1" it sets all the others to a binary "0". Each bank, upon receiving a binary "1" on the corresponding one of the lines ACCESS0-7, reads data from or writes data to the location in that bank selected by address lines A2-19 in response to appropriate control signals on the memory control lines 16 and byte enable lines BEN0-3.

In the preferred embodiment, the memory storage section 31 is implemented using conventional and commercially available dynamic semiconductor memory chips, but it will be recognized that the principles of the present invention are equally applicable to a static semiconductor memory, and the memory section 31 could be implemented with conventional and commercially available static memory chips.

In the preferred embodiment, the memory storage section 31 of the board 24 includes several conventional connectors which each can removably receive a module having thereon the integrated circuits containing the storage locations for one or two respective banks. For clarity of explanation, FIG. 2 diagrammatically depicts a respective connector at 31A-31H for each bank, but it should be understood that two of these connectors may in fact be implemented with a single physical connector device. Thus, although FIG. 2 shows all eight banks as being present, one or more of the banks can be omitted if the amount of memory required is less than 8 MB. For example, BANK6 and BANK7 can be omitted if only 6 MB is required, BANK4-BANK7 can be omitted if only 4 MB is required, and BANK2-BANK7 can be omitted if only 2 MB is required. Stated differently, only the module(s) containing BANK0 and BANK1 is (are) plugged into the connectors on the board if 2 MB is required, only the modules containing BANK-0-BANK4 are plugged into the connectors on the board if 4 MB is required, and only the modules containing BANK0-BANK5 are plugged into the connectors on the board if 6 MB is required.

The memory address decoding section 32 includes a 16-bit configuration register 36, six two-input exclusive OR gates represented by a single diagrammatic symbol at 37, and a decoding circuit 38. The configuration register 36 has sixteen data inputs which are each connected to a respective one of the data bus lines D0-D15. The register has a set input which is connected to line RESET, and a load control input which is discussed later. The register 36 is divided conceptually into two portions, namely an 8-bit memory size portion 41 and an 8-bit base address portion 42. The memory size portion 41 has eight output lines BNKSEL0-BNKSEL7, which are each connected to the decoding circuit 38. Each indicates whether access is to be allowed to a respective one of the memory banks BANK0-BANK7. For example, if the output line BNKSEL7 from the register 36 is a binary "1", it is an indication to the decoding circuit 38 that, in response to a memory address which would select a storage location in BANK7, it should produce a signal on line ACCESS7 to enable BANK7 to respond to the memory address. Similarly, if the line BNKSEL7 is a binary "0", it is an indication to the decoding circuit 38 that BANK7 is not to be enabled for any reason, or in other words that the line ACCESS7 is to be continuously maintained at a binary "0". Thus, since each bit in portion 41 of register 36 represents 1 MB, portion 41 indicates the size or amount of memory on the board, which in turn corresponds to the range of memory addresses to which the board will respond.

The base address portion 42 of the register 36 also has 8 bits and thus 8 output lines, but two of them indicated at 43 are not used. The other six outputs ABS20-25 represent the base address assigned to the memory expansion board 24, the base address being the first and lowest memory address in the range of contiguous addresses to which the board 24 is to respond. The lines ABS20-25 are the six most significant bits (MSBs) of the base address. The 20 least significant bits are assumed to be zero, which means that the base address always necessarily falls on a 1 MB boundary, or in other words is always an integer multiple of 1 MB. The lines ABS20-25 are each connected to the decoding circuit 28, and to one input of a respective one of the six exclusive OR gates 37. The other input of each of the exclusive OR gates 37 is connected to a respective one of the address bus lines A20-25. The outputs M20-25 of the exclusive OR gates are each connected to the decoding circuit 38.

The decoding circuit 38 is a combinational logic circuit. In essence, the lines ABS20-25 advise the decoding circuit 38 of the base or first address of the range of addresses to which the board 24 is to respond, the lines BNKSEL0-7, each of which corresponds to a respective one of the 1 MB memory banks BANK0-7, advise the decoding circuit 38 of the size of the range of addresses to which it is to respond, and the lines M20-25, which are a function of the memory address on lines A0-25, are used by the decoding circuit 38 to determine whether a memory address present on lines A0-25 is within the range of addresses to which the board 24 is to respond. The logic function implemented by the circuit 38 is set forth in FIGS. 5A to 5H in the form of Boolean equations, where "&" is a logic "AND" function, "+" is a logic "OR" function, and "!" is a logical negation.

The I/O address decode circuit 33 basically detects the situation in which the CPU 11 (FIG. 1) is sending data to the configuration register 36 across data bus lines D0-15, and produces an output SWSET which is connected to a load control input of the register 36 and causes 16 bits of data from the data bus to be loaded into the register 36. As mentioned above, the signal PRIVY is a logic "1" only during memory configuration, and is later changed to a binary "0". The I/O address decode 33 produces the signal SWSET only when the PRIVY signal is a binary "1", and thus when the signal PRIVY is a binary "0" it is impossible for a user program to inadvertently change the configuration register 36. The I/O address decode circuit 33 monitors address bus lines A0-9 and the signal BRDSEL to determine when the configuration register 36 is being addressed. In the preferred embodiment, the decode circuit 33 looks for I/O address F6 (hexadecimal) on the lines A0-9. As explained above with reference to FIG. 1, the signal BRDSEL is connected to address bus line A10 at connector 17, A11 at connector 18, and A12 at connector 19. Thus, for example, when respective memory expansion boards 24 are plugged into each of the slots 17, 18 and 19, the CPU 11 can selectively address the configuration register 36 on each board by placing on the address bus the respective hexadecimal addresses 4F6, 8F6 and 10F6 for the slots 17, 18 and 19. The logic function implemented by the I/O decode circuit 33 is set forth in FIG. 4 in the form of a Boolean equation, where "&", "+", and "!" have the meanings discussed above.

As discussed above, the eight memory banks BANK-0-7 on the memory expansion board 24 shown in FIG. 2 each have a size of 1 MB, which means that the total memory capacity of the board 24 is 8 MB. A variation of this board involves the use of banks which are each 4 MB, thereby giving the board a maximum capacity of 32 MB. This variation is effectively identical to the board shown in FIG. 2, except that the base address portion 42 of the register 36 has only four outputs (ABS22-25), there are only four exclusive OR gates 37 each having inputs connected to a respective one of the lines ABS22-25 and a respective one of the lines A22-25, and address lines A20 and A21 are connected to the memory address section 31 in addition to the address lines A2-A19. Further, the Boolean equations for the decoding circuit 38 are slightly different, but since those of ordinary skill in the art will recognize the changes which would be made to the Boolean equations set forth in FIGS. 5A to 5H, it is believed unnecessary to set forth a complete additional set of Boolean equations. Either the 8 MB board 24 shown in FIG. 2 or the 32 MB variation thereof just described can be plugged into connector 17 (FIG. 1), connector 18, or connector 19.

Figure 3A:
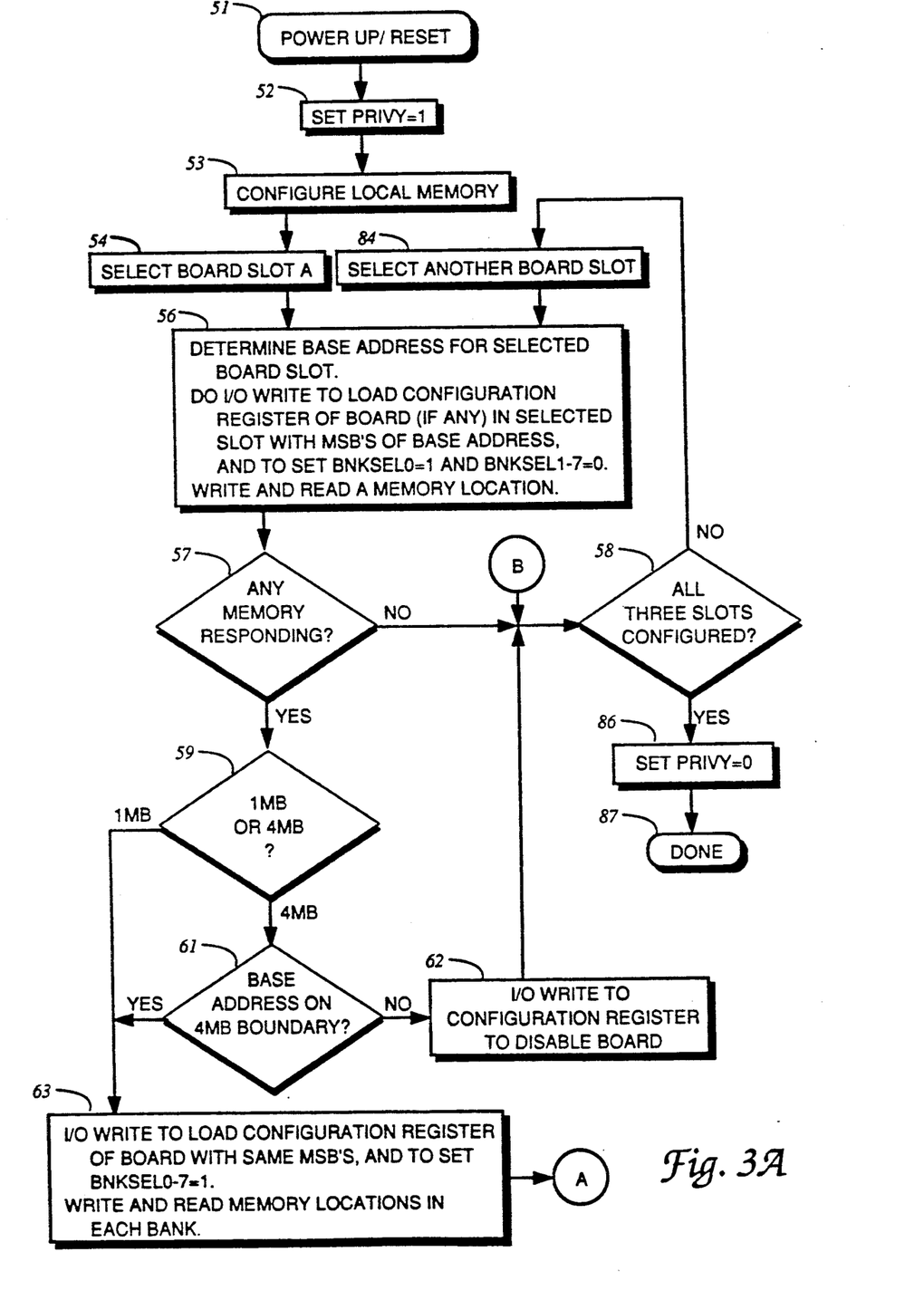
FIGS. 3A and 3B depict respective portions of a flow chart of a computer program implementing the inventive method.
Figure 3B:
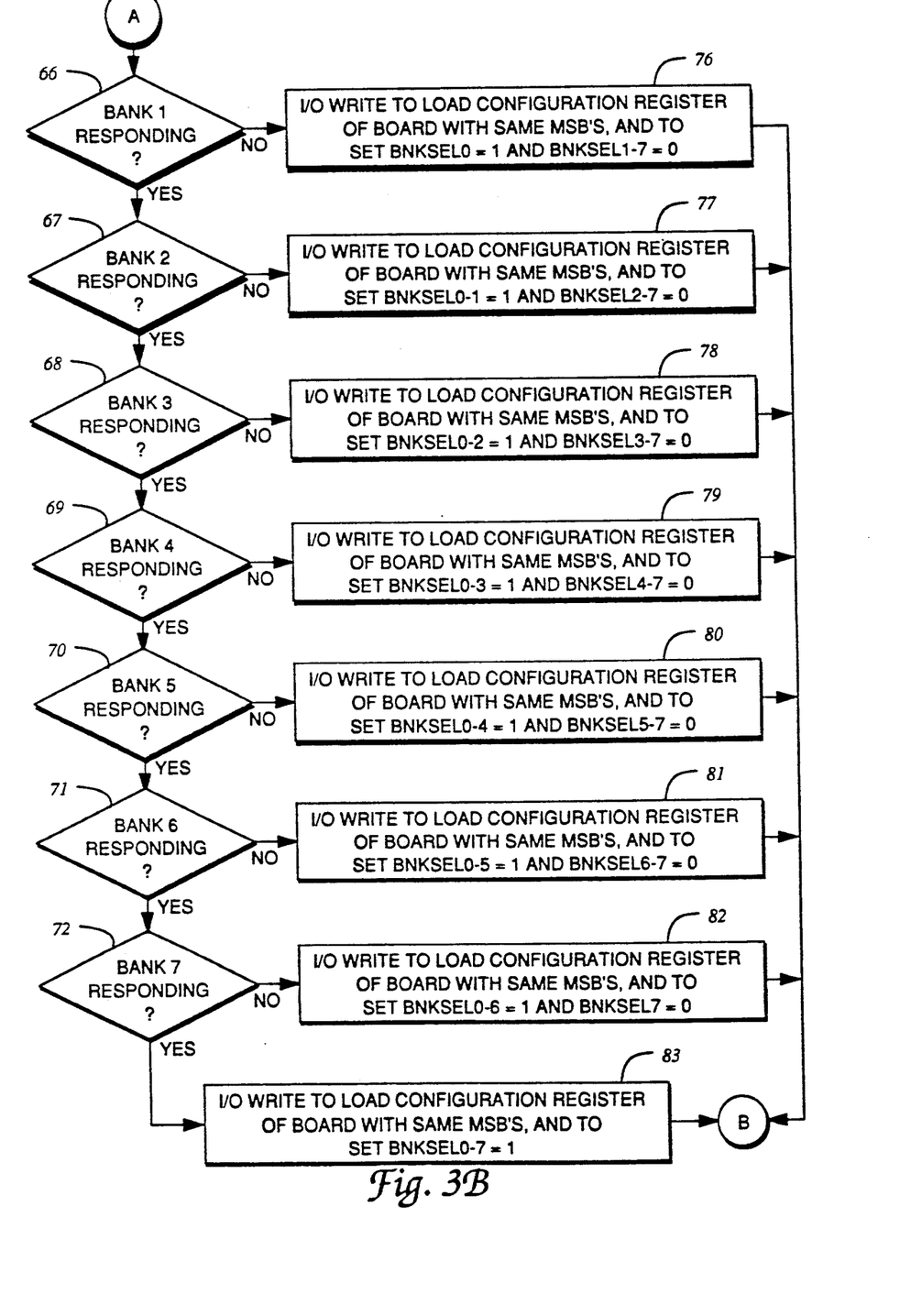

FIGS. 3A and 3B depict a flow chart representing the program carried out by the CPU 11 to configure any and all of the memory expansion boards which may be plugged into the slots 17-19. This program is preferably stored in the ROM 13, and is automatically performed following power-up, because a user may have added or removed memory expansion boards while the power was gone and it is thus necessary to determine whether any memory expansion boards are plugged into the slots 17-19, to determine how much memory is on each, and to assign each a specific range of memory addresses to which it is to respond.

Referring to FIGS. 3A and 3B, during power-up at 51, the CPU 11 outputs a RESET signal to set every bit in the configuration register 36 of each memory board which may be present, thereby forcibly setting the base address portion 42 of each configuration register 36 to represent a very high base address, which permits the CPU 11 to access the local memory 14 without interference from any expansion board during the configuration process. At 52, the CPU 11 sets the PRIVY signal to a binary "1" to enable configuration, and at 53 configures the local memory 14 in a manner described in detail later. Then, at 54, the CPU selects board slot A (connector 17) for configuration.

At 56, the CPU 11 determines a base address (on a 1 MB boundary) which is to be assigned to any memory expansion board which may be present in slot A. Normally, this base address is selected so that all addressable memory locations will have consecutive addresses, beginning at zero. Thus, if the RAM 14 is 5 MB and is assigned addresses from 0 to (5 MB - 1), the base address for any memory board in the connector 17 would be the next consecutive memory address, namely 5 MB. Still referring to block 56 in FIG. 3A, the CPU 11 does an I/O write operation to hexadecimal address 4F6, which is the configuration register 36 of any memory board which may be present in slot A. The CPU loads the base address portion 42 with the MSBs of the base address, and in the memory size portion 41 sets BNKSEL0 to a binary "1" and BNKSEL1-7 to a binary "0", thereby enabling memory bank BANK0 and disabling banks BANK1-BANK7. The CPU then reads and writes a location in BANK0 and, at block 57, checks to see if it received a response. If there is no response, it means there is no memory board plugged into slot 17, and the CPU terminates efforts to configure slot A and proceeds to block 58 to begin configuration of slot B. On the other hand, if a response is received at 57, the CPU proceeds to block 59, where it reads and writes one or more selected locations in order to determine whether BANK0 contains 1 MB or 4 MB of memory, or in other words whether the memory expansion board is the board 24 shown in FIG. 2 in which each bank is 1 MB of memory or is the variation of this board described above in which each bank is 4 MB of memory. If the CPU receives a 4 MB response, it proceeds to block 61 where it checks to see if the base address for the board, which is necessarily on a 1 MB boundary, is also on a 4 MB boundary (or in other words is an integer multiple of 4 MB). If it is not on a 4 MB boundary, the CPU proceeds to block 62 where it loads the configuration register 36 in the board with a value which sets all 8 bits in the memory size portion 41 to binary "0" to thereby disable the board and all of its memory banks, and proceeds to block 58 to begin configuration of the next board slot. However, when it is determined at block 59 or block 61 that the base address is on a proper boundary for the bank size, control proceeds to block 63, where the CPU loads the configuration register 36 again, the base address portion 42 being loaded with the same base address MSBs (so that it is not changed at all), and each bit of the size portion 41 being loaded with a binary "1" in order to enable every one of the 8 banks of memory (even though not all banks may actually be present). Then, the CPU 11 selectively reads and writes memory locations in each of the 8 banks in order to determine whether a module having the storage locations for each bank is actually plugged into the memory expansion board. In particular, the CPU successively checks BANK1 through BANK7 at blocks 66-72 and, as soon as it is found that any bank does not respond and is thus not present, the CPU proceeds to one of the blocks 76-83 to appropriately reload the configuration register 36, the base address portion 42 being given the same MSBs of the base address and thus not changing, and the memory size portion 41 being set to reflect the banks which are present and to be enabled and the banks which are disabled. It should be noted that, as soon as one bank is found to be missing, all subsequent banks are automatically assumed to be missing. Thus, if it is found that BANK4 is missing, is assumed that BANKS5-7 are also missing. Then, control is returned to block 58, where the CPU checks to see if all slots have been configured. If they have not, the CPU proceeds to block 84, where it selects another slot and repeats for that slot the process described above. On the other hand, if all slots have been configured, the CPU proceeds to block 86 where it sets the PRIVY line to a binary "0" to inhibit any inadvertent change in any of the configuration registers 36, and then proceeds to block 87, which represents completion of the configuration process and a point at which the CPU proceeds to other initialization routines or to normal processing.

Figure 6:
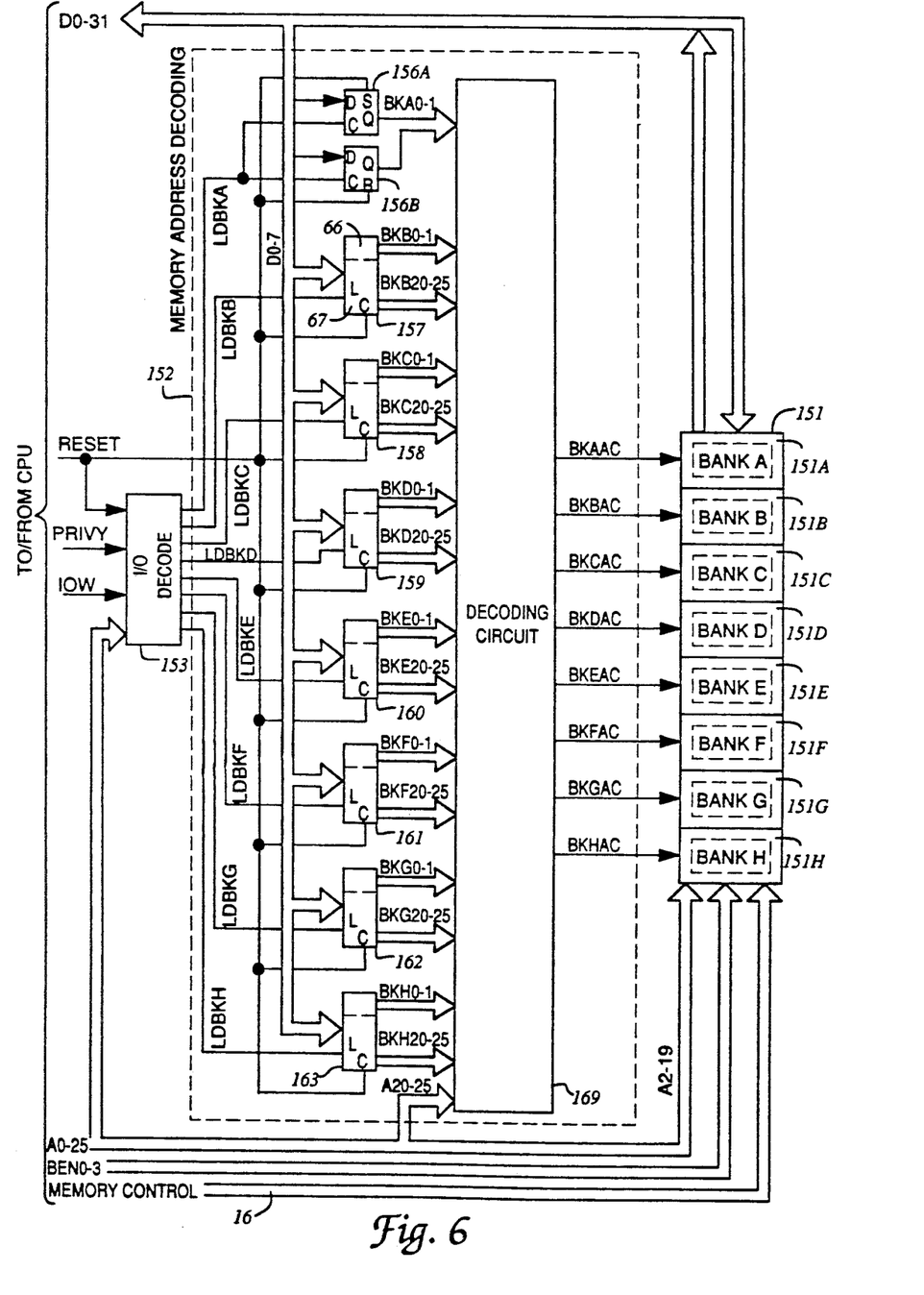
FIG. 6 is a diagrammatic view of a local memory which is part of the computer system of FIG. 1 and which embodies certain features of the present invention.

The local memory which is shown at 14 in FIG. 1 is shown in more detail in the diagrammatic view of FIG. 6. The signals transmitted to and from the local memory 14 by the CPU are shown at the left side of FIG. 6. The local memory 14 includes a storage region 151, a memory address decoding section 152, and an I/O address decoding section 153. The memory storage region 151 includes eight separate memory units BANKA-BANKH which are each removably inserted into a respective connector shown diagrammatically at 151A-151H and which each include a memory storage section having either 1 MB of addressable storage locations or 4 MB of addressable storage locations. Thus, if each of the memory units BANKA-BANKH has a storage section which is 4 MB, the storage region 151 will have a total of 32 MB of storage. As discussed above in association with the memory expansion board 24, each 1 MB of storage is arranged as 262,144 words of 32 bit (4 byte) length. In the local memory 14, it is not necessary for each of the memory units BANKA-BANKH to be of equal size. In other words, any desired mixture of 1 MB and 4 MB memory units can be plugged in as BANKA-BANKH, although it is preferable that all 4 MB memory units be installed in successive banks beginning with BANKA, and that any 1 MB memory units be installed as the remaining banks. A memory unit for BANKA must always be plugged in, but if one of the memory units BANKB-BANKG is missing, subsequent banks will not be ignored. For example, even if there is no memory unit present as BANKE, memory units present in BANKF-BANKH will be taken into account and utilized.

The memory address decoding section 152 produces eight lines BKAAC-BKHAL, each of which is connected to a respective one of the memory units BANKA-BANKH as an enable therefor. The lines BKAAC and BKHAC are all normally a binary "0", but the address decoding section 152 can selectively set any one of these lines to a binary "1", but when it sets one of them to a binary "1" all the others are set to a binary "0". Each bank, upon receiving a binary "1" on the corresponding one of the lines BKAAC-BKHAC, reads data from or writes data to the location in that bank selected by the address lines (A2-19 for a 1 MB bank, A2-21 for a 4 MB bank) in response to appropriate control signals on the memory control lines 16 and byte enable lines BEN0-3.

In the preferred embodiment, the storage region 151 is implemented using conventional and commercially available dynamic semiconductor memory chips, but the principals of the present invention are equally applicable to a static semiconductor memory, and the region 151 could be implemented with conventional and commercially available static memory chips.

The memory address decoding section 152 includes eight configuration registers 156-163 which each correspond to a respective bank, the configuration register 156 being implemented with two D flipflops 156A and 156B and the configuration registers 157-163 each being implemented with a conventional and commercially available 8-bit register. The configuration register 157 will be described in detail first.

The configuration register 157 has a clear input which is connected to the power-up reset line RESET, and has a load input controlled by a load signal LDBKB in a manner described later. The 8 data inputs of the configuration register 157 are connected to lines D0-7 of the bidirectional data bus. The register 157 is divided conceptually into a 2-bit size portion 166 and a 6-bit base address portion 167. The base address portion 167 is similar to the portion 42 of register 36 in FIG. 2, and holds the MSBs of a base address for the corresponding memory unit BANKB. The two bits of the size portion 166 define the amount of storage in the memory unit, as shown below in Table 1.

TABLE 1

| BKB1 | BKB0 | |
|---|---|---|
| 0 | 0 | Disabled |
| 0 | 1 | 1 MB |
| 1 | 0 | (Not Used) |
| 1 | 1 | 4 MB |

Figure 7:
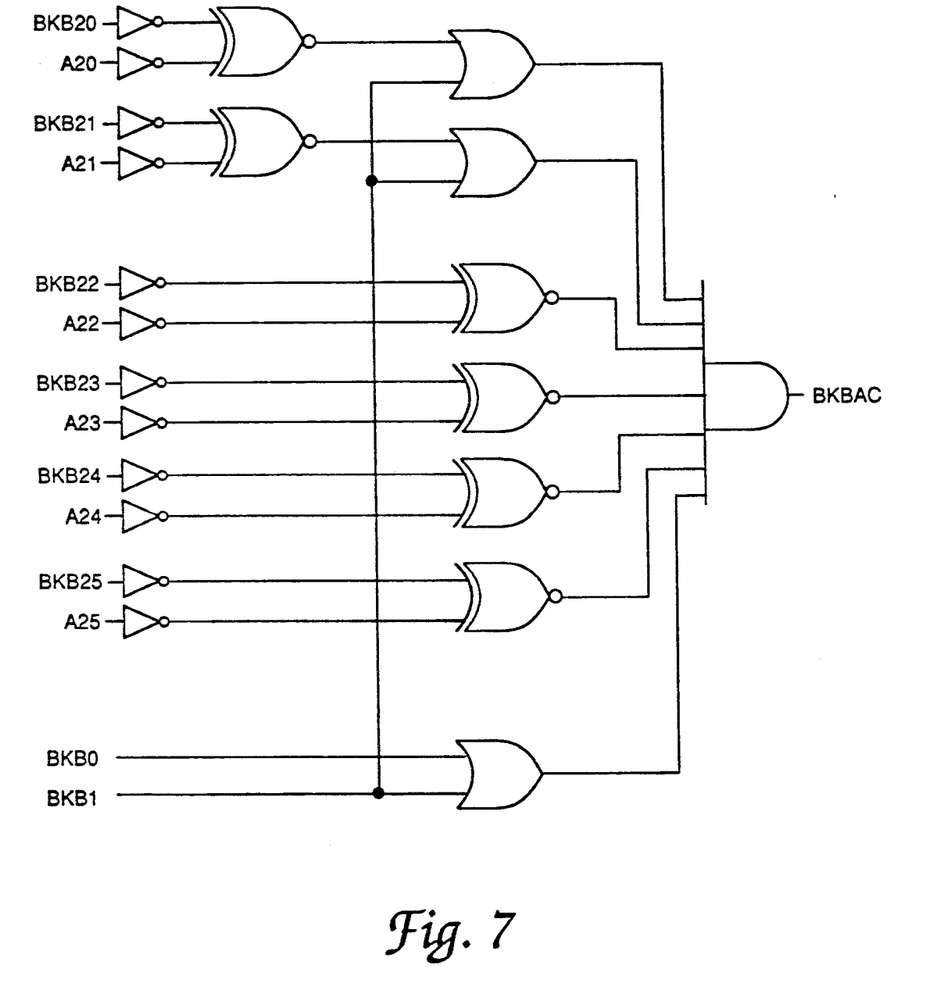
FIG. 7 is a schematic diagram of a logic circuit which is part of a decoding circuit of the local memory of FIG. 6.

The output BKB0-1 of the size portion 166 and the outputs BKB20-25 of the address portion 167 are each connected to a decoding circuit 169, which also has inputs connected to lines A20-25 of the address bus. FIG. 7 shows the portion of decoding circuit 169 which combines the eight signals from configuration register 157 with the six signals A20-A25 from the address bus in order to produce the output BKBAC which is connected to BANKB of the memory region 151.

The configuration registers 158-163 are each similar to the register 157, and are each connected to a respective logic network in the circuit 169 which is identical to that shown in FIG. 7 and which produces a respective one of the outputs BKCAC-BKHAC. At power-up, the signal on the reset line RESET clears each of the configuration registers 157-163, thereby setting the size bits to binary "00" in order to disable the corresponding memory bank.

By definition, the base address for the memory unit BANKA is always zero. Consequently, since the base address portion of the corresponding configuration register 156 would always contain zero, the base address portion has been physically omitted in order to reduce hardware costs, and only the 2-bit size portion is provided, and is implemented by the two flipflops 156A and 156B. The portion of the decoding circuit 169 to which the outputs of the flipflops 156A and 156B are connected is basically equivalent to that shown in FIG. 7, except that inputs thereof which would normally be connected to the omitted base address portion of configuration register 156 are grounded to simulate the presence of a base address portion containing a value of zero. The resulting output is, of course, signal BKAAC, which is connected to the memory unit BANKA. At power-up, the reset signal RESET sets the flipflop 156A and resets the flipflop 156B so as to forcibly set the size portion of configuration register 156 to a binary "01" which, as evident from Table 1, represents 1 MB. Thus, after power-up, the CPU 11 will automatically have access to 1 MB of memory in memory unit BANKA.

The I/O address decoding section 153 produces eight load control signals LDBKA-LDBKH which are each connected to a respective one of the configuration registers 156-163. The respective I/O addresses for these eight load control signals have been selected to be the following hexadecimal values: 08F4, 18F4, 28F4, 38F4, 48F4, 58F4, 68F4 and 78F4. Each of the load control signals is produced by a circuit implementing a logic function similar to the logic function set forth in Boolean form in FIG. 4. Those of ordinary skill in the art will understand from FIG. 4 how to generate each output of the decode circuit 153 in FIG. 6, and it is therefore believed unnecessary to give further details of the decode circuit 153 here.

Figure 8:
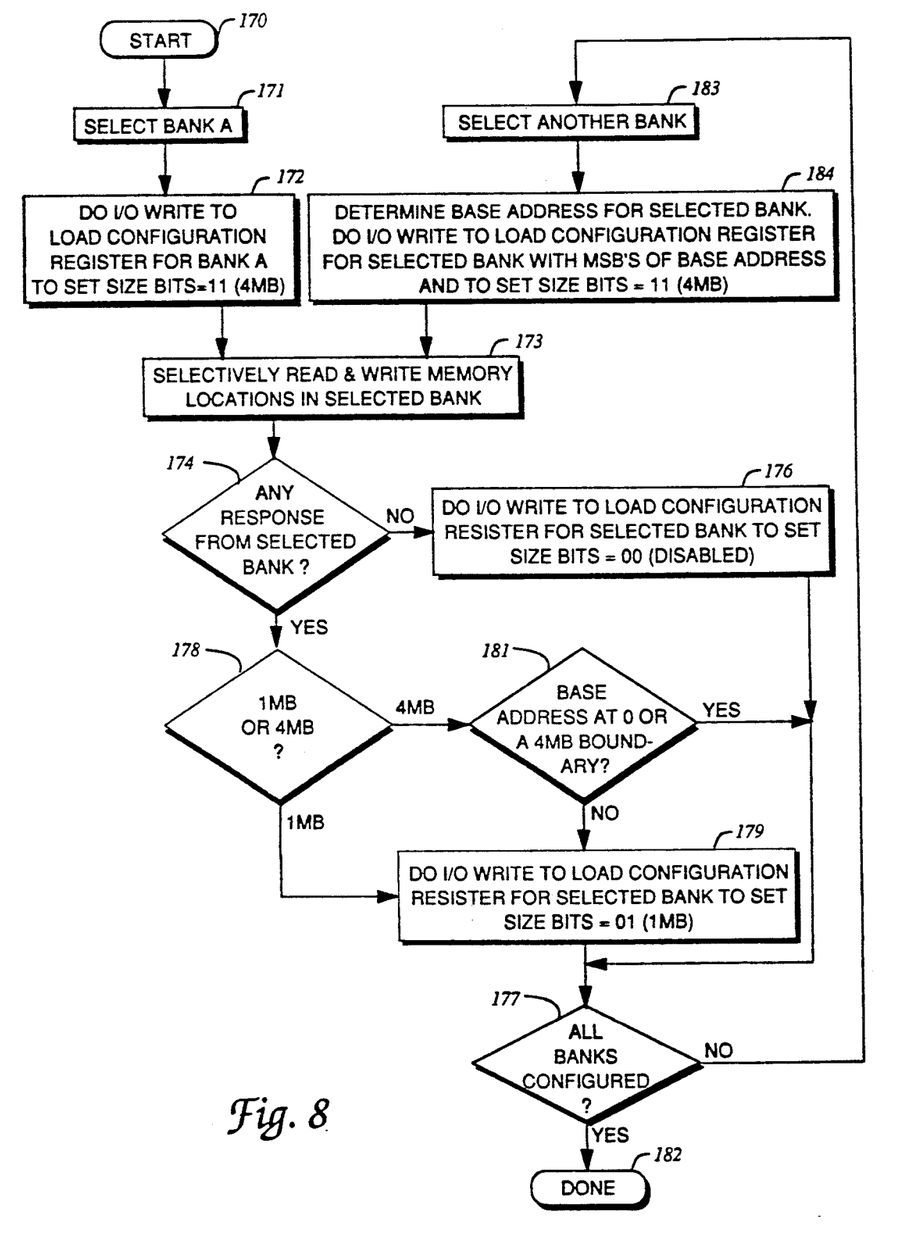
FIG. 8 is a flowchart which sets forth in greater detail a portion of the computer program depicted in the flowchart of FIGS. 3A and 3B.

FIG. 8 depicts a flowchart representing the block 53 in the flowchart of FIGS. 3A and 3B, in particular the method by which the CPU 11 configures any and all of the memory units BANKA-BANKH which may be removably plugged into the respective connectors of the storage region 151. Beginning at 170, the CPU selects memory unit BANKA to be configured first at 171, and then loads the corresponding configuration register 156 at 172 so as to set the size bits equal to binary "11" or in other words 4 MB. Then, at 173, the CPU selectively reads and writes memory locations in the selected bank. At 174, the CPU checks to see whether it is receiving any response. If it is not, then there is no memory unit plugged in to serve as the selected bank and the CPU proceeds to block 176 where it sets the size bits of the configuration register for that bank to binary "00" in order to disable the associated decoding circuitry, and control then proceeds to block 177. On the other hand, if proper responses to memory reads and writes are received at block 174, control proceeds to block 178 where the CPU determines whether the memory responding has a size of 1 MB or 4 MB. If the memory responding has a size of 1 MB, control proceeds to block 179. Otherwise, control proceeds to block 181, where the CPU checks to see whether the base address loaded into the configuration register for the bank is zero or an integer multiple of 4 MB. If it is, control proceeds to block 177. Otherwise, only 1 MB of the available 4 MB will be used, and control proceeds to block 179. At block 179, the CPU does an I/O write to the configuration register to set the size bits to binary "01", or in other words a size of 1 MB. Then, control proceeds to block 177, where the CPU checks to see if all banks have been configured. If they have, control proceeds to 182, which in effect routes the CPU to block 54 in FIG. 3A. If it is determined at 177 that all blocks have not been configured, control proceeds to block 183, where the CPU selects another bank, and then at block 184 the CPU determines an appropriate base address for the selected bank and then loads the configuration register for the selected bank with the MSBs of the base address and sets the size bits to binary "11" or in other words 4 MB. Control then proceeds to block 173, which has already been described.

It will be recognized that the CPU can also perform diagnostics on each bank of memory in FIGS. 2 and 6 and, if errors are detected, disable that bank by appropriately setting the bits of the size portion of the associated configuration register.

Although a preferred embodiment of the invention has been shown in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A method for automatic memory configuration by a computer coupled to a connector which can be detachably electrically coupled to a memory unit having a storage section with a plurality of addressable storage locations, including address decoding means for defining a range of consecutive computer memory addresses to which said storage section of said memory unit is to respond, said address decoding means including a base address register which specifies the first memory address in said range and a size register which specifies the number of addresses in said range, said method comprising the steps of: determining a base address to be associated with said connector; thereafter outputting to said base address register a first value representing said base address; outputting to said size register a second value defining a maximum number of addresses in a maximum range of addresses for the memory unit; thereafter selectively accessing storage locations having different addresses within said maximum range of addresses to thereby determine by the presence and absence of responses from the memory unit the actual number of contiguous storage locations present in the storage section thereof; and thereafter replacing said second value in said size register, when the actual number of contiguous storage locations in said storage section is less than said maximum number of addresses in said maximum range, with a third value representing said actual number of contiguous storage locations in the storage section of the memory unit.

2. A method for automatic memory configuration by a computer coupled to a connector which can be detachably electrically coupled to a memory unit having a storage section with a plurality of addressable storage locations, including address decoding means for defining a range of consecutive computer memory addresses to which said storage section of said memory unit is to respond, said address decoding means including a base address register which specifies the first memory address in said range and a size register which specifies the number of addresses in said range, said method comprising the steps of: determining a base address to be associated with said connector; thereafter outputting to said base address register a first value representing said base address; outputting to said size register a second value defining a maximum number of addresses in a maximum range of addresses for the memory unit; thereafter selectively accessing storage locations having different addresses within said maximum range of addresses to thereby determine by the presence and absence of responses from the memory unit the actual number of contiguous storage locations present in the storage section thereof; and thereafter replacing said second value in said size register, when the actual number of contiguous storage locations in said storage section is less than said maximum number of addresses in said maximum range, with a third value representing said actual number of contiguous storage locations in the storage section of the memory unit; wherein said actual number of contiguous storage locations in said memory unit is one of a first predetermined number of locations and a second predetermined number of locations larger than said first predetermined number; and wherein said step of selectively accessing storage locations to determine the actual number of contiguous storage locations includes the step of determining which of said first and second predetermined numbers is said actual number of contiguous storage locations.

3. A method of claim 1 including, after said step of determining which of said first and second predetermined numbers is said actual number of locations, the step of determining whether said first value represents a base address which is an integer multiple of said second predetermined number when said actual number is said second predetermined number and, when said first value represents a base address which is a number other than an integer multiple of said second predetermined number, the step of terminating configuration with respect to said connector and setting said size register to a fourth value which disables the memory unit detachably coupled to said connector.

4. A method of claim 2 including, after said step of determining which of said first and second predetermined numbers is actual number of locations, the step of determining whether said first value represents a base address which is an integer multiple of said second predetermined number when said actual number is said second predetermined number and, when said first value represents a base address which is a number other than an integer multiple of said second predetermined number, the step of setting said size register to a fourth value representing said first predetermined number.

5. A method for automatic memory configuration by a computer coupled to a connector which can be detachably electrically coupled to a memory unit having a storage section with a plurality of addressable storage locations, including address decoding means for defining a range of consecutive computer memory addresses to which said storage section of said memory unit is to respond, said address decoding means including a base address register which specifies the first memory address in said range and a size register which specifies the number of addresses in said range, said method comprising the steps of: determining a base address to be associated with said connector; thereafter outputting to said base address register a first value representing said base address; outputting to said size register a second value defining a maximum number of addresses in a maximum range of addresses for the memory unit; thereafter selectively accessing storage locations having different addresses within said maximum range of addresses to thereby determine by the presence and absence of responses from the memory unit the actual number of contiguous storage locations present in the storage section thereof; thereafter replacing said second value in said size register, when the actual number of contiguous storage locations in said storage section is less than said maximum number of addresses in said maximum range, with a third value representing said actual number of contiguous storage locations in the storage section of the memory unit; and including, prior to said accessing step, the step of addressing a storage location within the address range defined by said first and second values and, in the absence of a response, terminating configuration with respect to said connector.

6. A method of claim 5, wherein said step of addressing is carried out prior to said step of outputting said second value, and including, prior to said step of addressing, the step of outputting a fourth value to said size register representing a number of addresses greater than zero and less than said maximum number of addresses in said maximum range.

7. A method of claim 6, wherein said computer is connected to a plurality of said connectors, and including the step of carrying out for each of said connectors said steps of determining, outputting said first value, outputting said third value, addressing, outputting said second value, accessing, and changing.

8. A method of claim 5, wherein said step of addressing is carried out after said step of outputting said second value, wherein said computer is connected to a plurality of said connectors, and including the step of carrying out for each of said connectors said steps of determining, outputting said first value, outputting said second value, addressing, accessing, and changing.

9. A method for automatic memory configuration by a computer coupled to a connector which can be detachably electrically coupled to a memory unit having a storage section with a plurality of addressable storage locations, including address decoding means for defining a range of consecutive computer memory addresses to which said storage section of said memory unit is to respond, said address decoding means including a base address register which holds a first value defining the first memory address in said range and a size register which holds a second value defining the number of addresses in said range, said method comprising the steps of: determining a base address to be associated with said connector; thereafter outputting to said base address register a first value representing said base address; outputting to said size register a second value defining a maximum number of addresses in a maximum range of addresses for the memory unit; thereafter selectively accessing storage locations having different addresses within said maximum range of addresses to thereby determine by the presence and absence of responses from the memory unit the actual number of contiguous storage locations present in the storage section thereof; and thereafter replacing said second value in said size register, when the actual number of contiguous storage locations in said storage section is less than said number of addresses in said maximum range, with a third value representing said actual number of contiguous storage locations in the storage section of the memory unit; wherein said storage section of said memory unit has a plurality of separately removable memory banks which each have therein an identical number of said addressable storage locations, and wherein said step of accessing includes the step of accessing a storage location in each of said memory banks to determine whether each of said memory banks is present in said memory unit.

10. A method of claim 9, wherein said number of storage locations in each of said banks is one of a first predetermined number and a second predetermined number; wherein said size register indicates whether each of said banks is operationally enabled; including, prior to said step of outputting said second value, the step of outputting for said size register a fourth value which enables one of said banks and disables all others of said banks; and including, after said step of outputting said fourth value and before said step of outputting said second value, the step of selectively addressing locations to determine which of said first and second predetermined numbers is equal to the number of locations in said one of said memory banks.

11. A method according to claim 10, including the step of selecting said second predetermined number to be an integer multiple of said first predetermined number, wherein said step of outputting said first value includes the step of selecting said first value to represent an integer multiple of said first predetermined number, and including, after said step of determining which of said first and second predetermined numbers is the number of locations in said one of said memory banks, the step of determining whether said first value represents a base address which is an integer multiple of said second predetermined number when said actual number of locations is said second predetermined number and, when said first value represents a base address which is a number other than an integer multiple of said second predetermined number, terminating configuration with respect to said connector and setting said size register to a value which disables all of said memory bank.

12. An apparatus comprising: a computer; a memory unit having a storage section with a plurality of addressable storage locations; connector means for detachably electrically coupling said memory unit to said computer; and address decoding means for defining a range of consecutive computer memory addresses to which said storage section of said memory unit is to respond, said address decoding means including a base address register which specifies the first memory address in said range and a size register which specifies the number of addresses in said range; said computer including means for determining a base address to be associated with said connector means; means for outputting to said base address register a first value representing said base address; means for outputting to said size register a second value defining a maximum number of addresses in a maximum range of addresses for said memory unit; means for thereafter selectively accessing storage locations having different addresses within said maximum range of addresses to thereby determine by the presence and absence of responses from said memory unit the actual number of contiguous storage locations present in said storage section thereof; and means for thereafter replacing said second value in said size register, when the actual number of contiguous storage locations in said storage section is less than said maximum number of addresses in said maximum range, with a third value representing said actual number of contiguous storage locations in said storage section of said memory unit.

13. A memory apparatus for a computer, comprising: a memory unit having a storage section which includes a plurality of addressable storage locations; connector means for detachably electrically coupling said memory unit to the computer; and address decoding means for determining whether a computer memory address output by the computer to which said memory unit is detachably electrically coupled is within a range of consecutive addresses, said address decoding means including a base address register, a size register and means for facilitating loading of first and second values respectively into said base address and size registers from the computer to which said memory unit is detachably electrically coupled, said first value defining a first memory address of said range and said second value defining the number of addresses in said range; said storage section including means responsive to detection by said address decoding means that a computer memory address is within said range of addresses for facilitating access to a corresponding one of said plurality of addressable storage locations by the computer to which said memory unit is detachably electrically coupled; wherein said storage section of said memory unit includes a plurality of connectors and includes several memory bank modules which are each removably coupled to a respective one of said connectors and which each have thereon an identical predetermined number of said addressable storage locations, and wherein said size register has a plurality of output lines equal in number to the number of said connectors in said storage section, each of said output lines of said size register corresponding to a respective said connector and serving in first and second binary states to respectively enable and disable the connector and any said memory bank module removably coupled thereto.

14. An apparatus comprising: a memory circuit having a storage section which includes a plurality of addressable storage locations and address decoding means for defining a range of consecutive memory addresses to which said storage section of said memory unit is to respond, said address decoding means including a base address register which specifies the first memory address in said range and a size register which specifies the number of addresses in said range, wherein said storage section of said memory unit includes a plurality of connectors and includes several memory bank modules which are each removably coupled to a respective one of said connectors and which each have thereon an identical predetermined number of storage locations, and wherein said size register has a plurality of output lines equal in number to the number of said connectors in said storage section, each of said output lines of said size register corresponding to a respective said connector and serving in first and second binary states to respectively enable and disable the connector and any said memory bank module removably coupled thereto.

* * * * *